United States Patent [19]

Martinez Mendez

[11] 4,196,482

[45] Apr. 8, 1980

[54] TOILET TANKS

[76] Inventor: Juan Martinez Mendez, Crucecita a Esperanza 46, San Jose, Caracas 101, Venezuela

[21] Appl. No.: 942,044

[22] Filed: Sep. 14, 1978

[51] Int. Cl.² ............................................. E03D 1/36
[52] U.S. Cl. .......................................... 4/366; 4/378; 4/401
[58] Field of Search ................... 4/353, 354, 355, 361, 4/362, 378, 366, 359, 397, 401, 405

[56] References Cited

U.S. PATENT DOCUMENTS

| 3,758,892 | 9/1973 | Mendez | 4/355 |
| 4,143,433 | 3/1979 | Skousgaard | 4/362 |

*Primary Examiner*—Houston S. Bell, Jr.
*Attorney, Agent, or Firm*—Fisher, Christen & Sabol

[57] ABSTRACT

A water tank is disclosed suitable for connection to the bowl of a toilet device, the tank being provided with a flush valve actuated from the top end by an actuating device; an inlet valve of the up-closing type, connected to the water supply system; buoyant pulling mechanism for the inlet valve to carry the closing element onto the up-closing seat, to prevent the further entrance of water into the tank, when a predetermined level has been reached; and a rocking lever, mechanically connected to said flush valve actuating device, suitable to push the closing element of the inlet valve downwardly, against the buoyant mechanism and water pressure forcing it upwardly, so as to open the inlet passage of the valve, in order to replenish said tank, upon the flushing thereof, until said predetermined level is again reached.

8 Claims, 3 Drawing Figures

TOILET TANKS

BACKGROUND OF THE INVENTION

Field of the Invention

This invention relates to water tanks, suitable to be used with toilet bowls and the like, in order to flush the same with a water volume contained therein.

Cross-Reference to Related Prior Art

The instant invention is an improvement on the art taught by U.S. Pat. No. 3,758,892, issued on Sept. 18, 1973, in the name of the applicant hereof.

Prior Art

In the above recited patent, a tank was disclosed and claimed, extending vertically above the bowl, and provided with a vertically movable plug to control the discharge of water for flushing purposes. The plug was operated by a vertical hollow rod projecting upwardly beyond the top of said tank and having a "small syringe", comprising a float means provided at the top of the tank, in order to close a small opening to provide for the buildup of pressure inside said tank, so as to preclude the further entrance of water.

Although said tank has been considered as suitable to comply with the requirements of a toilet assembly, it has been discovered that, due to the fact that water enters into said tank freely, with just the restriction of the "small syringe" provided at said tank, in those water systems working at relatively high pressure, e.g., with hydro-pneumatic systems for multi-staged buildings, the inner pressure to be reached within said vertical tank, in order to prevent the further entrance of water is of a rather high magnitude. Therefore, in some instances, the tank cover becomes dislodged from its place by said pressure, and in other instances, a continuous flow of water is established through the overflow, or a dripping appears through softwares, couplings, etc., with the consequent waste of water, troubles, and high bills for this utility.

SUMMARY OF THE INVENTION

This invention provides improvements on said tank, by means of which said high-pressure inside said tank is avoided. There is provided an inlet valve connected to said water system, in order to control the amount of water inside said tank; a floating means, connected to said valve, in order to carry the plug or closing member thereof upwardly, into the top seat of the valve, to close said valve; a flush valve, at the bottom of said tank, with a specially designed plug suitably connected to a hollow rod axially extended within said tank, and protruding through the top cover thereof; there being provided a ring driver at said rod capable of moving a rocking means carried atop of a vertical bar; said rocking means, in turn, pushes a link means rigidly connected to the inlet valve plug downwardly, away from said top seat, to open the water passage of said valve into said tank, when said rod is pulled upwardly to flush the toilet. Said inlet valve is closed again when said link follows the upward thrust from said floating means, upon the maximum level being reached by water inside said tank.

Said inlet valve is formed with an outer hollow body; a first axial passage extending upwardly from the bottom end thereof, ending in a plurality of radially extending passages, of lesser diameter, directed into an internal chamber, the upper wall of which is provided with a seat member through which a second passage is formed. Said link means extends axially through said opening, with said plug connected to the lower end thereof, inside said chamber, and with said second passage leading to the outlet, in order to provide for the water flow into said tank when said plug is in its downward or inoperative position, and to prevent said water flow when said plug is in its upward or operative position.

DESCRIPTION OF THE PREFERRED EMBODIMENT

Figure 1:
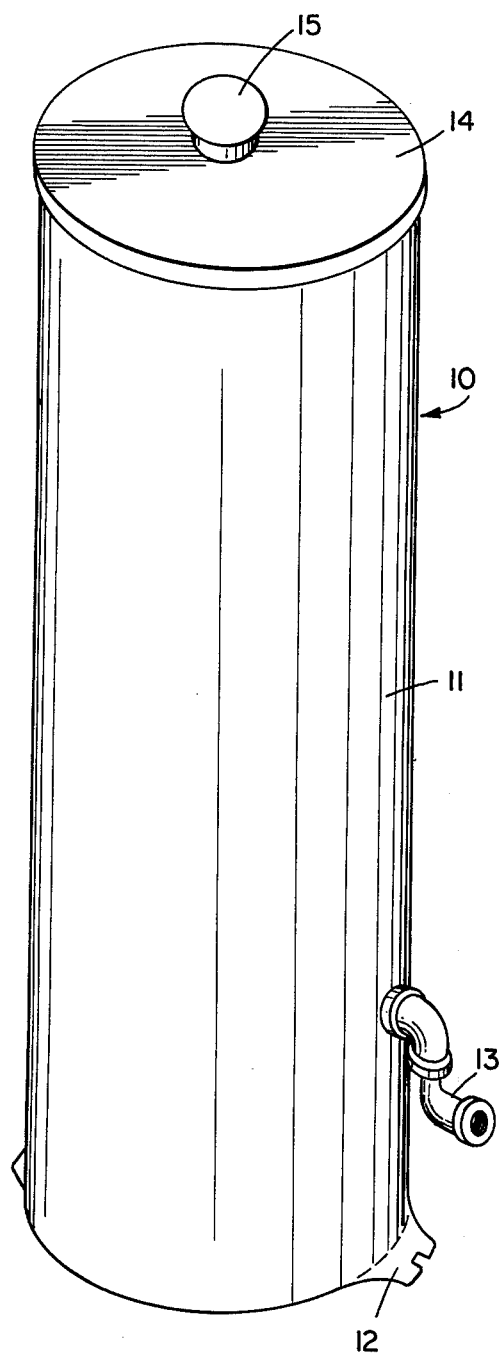
FIG. 1 is a conventional perspective view of the tank of this invention, showing the actuating knob and the connecting fixture to a water system.
Figure 2:
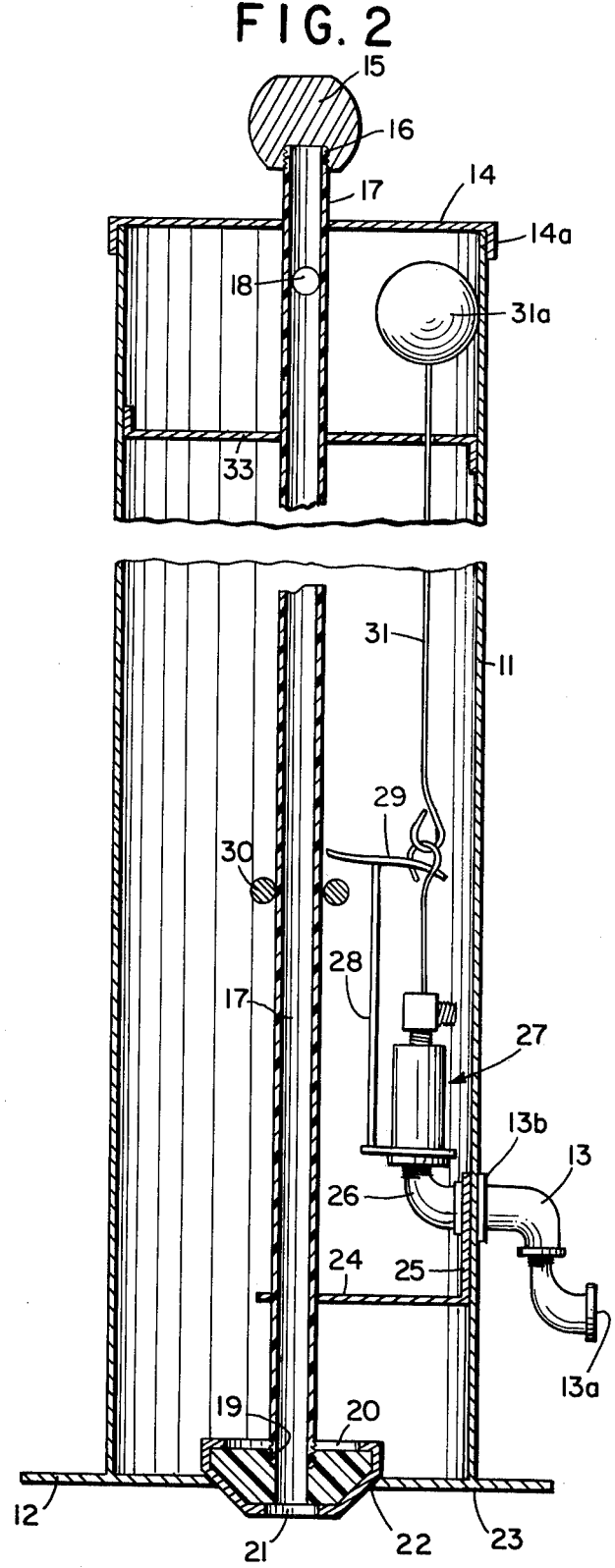
FIG. 2 is a vertical cross-sectional view, showing the interior of said tank.

The tank of this invention can be made with any desired shape, for instance, the one shown in the above identified patent, or the cylindrical shape shown in FIG. 1 of the herein annexed drawings. Said tank is formed with a side wall 11, a bottom wall 23 (FIG. 2) closing the lower end of said wall 11, and carrying diametrically outwardly extending connecting flanges 12, suitable to rigidly connect said tank to the corresponding rear portion of a toilet bowl (not shown). At the upper end of said wall 11, there is provided a removable cover 14, with a downwardly depending flange 14a, extending around the side wall 11. Said flange can optionally be provided with locking means (not shown) in order to avoid any non-intentional removal of said cover 14. Through the center of said cover 14, the upper portion of a hollow rod 17 protrudes, with the end thereof provided with threads as in 16, on which an actuating knob 15 is threaded, so as to facilitate the gripping of the rod 17, and the pulling thereof upwardly to open the flush valve of said tank 10.

Said rod 17 extends axially from the bottom of said tank to said protruding portion, serving as the actuating means for the flush valve, and also as the overflow duct, through which the overflow water can be conducted to the bowl, passing through a suitable opening 18, provided near the upper end thereof. At the lower end, said rod 17 is provided with threads 19, by means of which it is connected to the flush valve plug 20, formed of a soft elastic body capable of forming a water-proof seal with the opening 22 formed in the lower wall 23. Through said plug 20, an axial passage 21 is formed, in open flow relationship with said rod 17, so that the overflow water can be delivered to the bowl.

An angled positioner, formed by a horizontal plate 24, extending to the center of the tank and a vertical plate 25, connected to said wall 11, slidably receives said rod 17 through an aperture in order to guide the same in a substantially upright position. Said position is also maintained by means of an upper guide 33, having a vertically aligned aperture through which rod 17 passes. Said vertical plate 25 can be connected to said wall 11 by any suitable means, such as by welding or the like, but it is preferred that the same be connected by means of the tubular members jointly referred to as the fixture 13.

Figure 3:
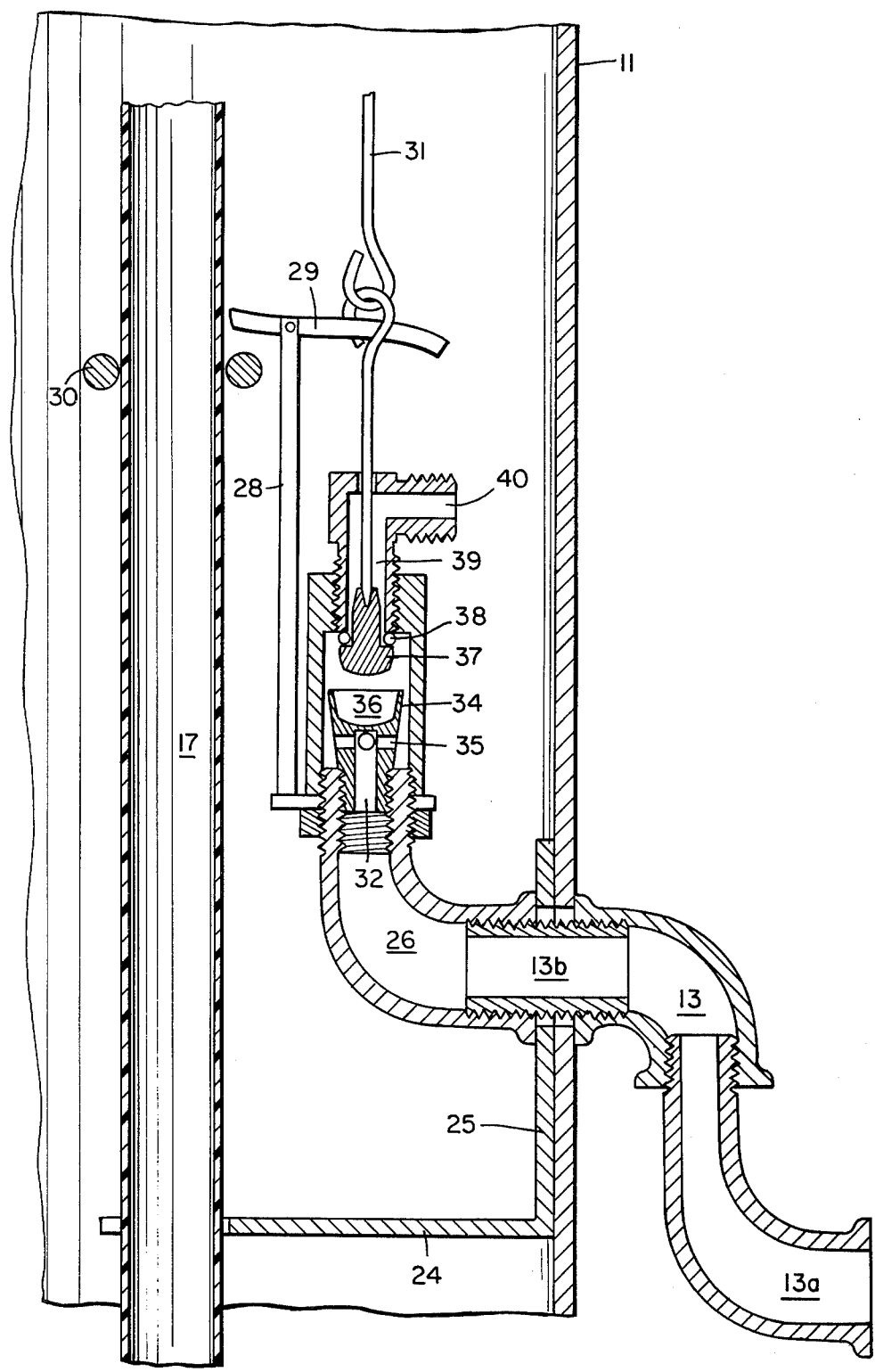
FIG. 3 is a partial enlarged vertical cross-sectional view, illustrating the inlet valve and the connections thereof, with more detail.

Said fixture 13 is formed by an outer bent tube contiguous to said wall 11, threadedly connected to a nipple 13b, passing through said wall, a terminal bent end 13a, also threadedly connected to the free end of said outer bent tube, wherein the water system is connected, and an inner bent tube 26, also threadedly connected to said nipple 13b, extending internally into said tank. Said inner tube 26, when threaded on said nipple 13b, can be fasten said vertical plate 25 in place, as clearly shown in FIG. 3.

The upwardly bent free end of said tube 26 is threadedly connected to the bottom of said inlet valve, generally designed by numeral 27, and also to an assembly formed by a horizontal platform wherein a vertical bar 28 is supported. Said vertical bar extends upwardly beyond the upper end of said inlet valve 27, for a purpose to be discussed hereinbelow. The upper end of said bar 28 carries a pivot on which a rocking member 29 is supported. One of the ends of said member 29 extends into said hollow rod, ending at a short distance thereof, above a ring driver 30, carried by said rod 17. The contrary or opposite end of said member 29 extends through a ring formed on link means 31, vertically depending downwardly from a float 31a. Said float, in turn, is located vertically above said valve 27 and is arranged to remain always above said upper guide 33, so as this latter may limit the descent thereof when the water level is below said guide. Of course, said link member 31 slidably passes through a suitable guide aperture provided at said upper guide 33.

Said valve 27 is comprised of a generally cylindrical hollow body, with a bottom inlet passage 32, formed on an internal inverted frusto-conical body portion 34. The upper end of said passage 32 is closed, and a plurality of radially extending passages 35 are provided in fluid communication therewith. Every radial passage 35 ends laterally to said frusto-conical portion 34, opening into an internal chamber, externally limited by the outer wall of said cylindrical body. A cup-like recess 36 is formed at the upper end of said frusto-conical portion 34, open to said chamber.

The upper end of said chamber is closed by a wall through which an outlet opening 39 is provided, in fluid-communication with said outlet 40 and said chamber, and defines an upper seat for said valve. A plug 37, made of a soft and elastic material, is located inside said chamber and partially inserted into said opening 39. A circular ring 38 is provided at said plug, in order to bear against said opening 39, to constitute a water-tight seal therewith. The upper end of said plug is connected to said link 31, and a suitable aperture is provided at said passage 39, for the passing of said link 31 therethrough.

The water flow, coming from a water supply (not shown), enters through said fixture 13, then upwardly to said inlet passage 32 of said valve 27, in order to fill up said internal chamber from said plurality of radial passages 35. Due to the shape of the frusto-conical portion 34, extending upside-down, water gradually arises from bottom to the top of said chamber and, by doing so, the water tight seal of said plug 37 onto the topseat of the valve is maintained due to the water pressure. However, as said plug 37 can be forced downwardly until received within said cup-like recess 36, a nonobstructed flow through said opening 39 and outlet 40 can be established into the tank. However, this non-obstructed flow only can be effected as long as the float 32 remains in a lowered position, and when the water level forces it upwardly, to the position illustrated in FIG. 2, the upward thrust will pull said plug upwardly, (via link 31) to the closed position. When this happens, as the pressure inside said chamber will remain still and the same, said pressure will act on the lower portion of said plug 37, in order to increase the seal formed thereby.

When flushing action is desired, all is needed is to pull said knob 15 upwardly, carrying said rod 17 therewith, in order to open said flush valve, whereby water will escape flushingly through said opening 22. At the same time, upon pulling said rod, the ring driver 30 contacts the nearby end of said rocking member 29, carrying the same upwardly and, therefore, carrying the opposite end downwardly. As said opposite end engages said ring of the link connecting said float 31a and said plug 37, this latter will be pushed downwardly and away from said opening 39, thus breaking the seal and leaving said plug 37 within said cup-like recess 36, at the open position, whereby said non-obstructed flow is again established to replenish said tank. While in said open position, the water flow cannot carry said plug 37 upwardly to close said opening 39, since the same is almost wholly hidden within said recess 36; there being needed the action of the buoyant means 31a to force it out of said recess 36, and then the water pressure can act to maintain a water-tight seal against the valve seat, as above discussed.

Further to the advantages pointed out in the above identified patent, this improved tank provides a number of advantages easily obvious to those skilled in the art, overcoming, at the same time, the disadvantages possessed by the prior art tank. It will be obvious, as well, to those skilled in the art, that certain changes and modifications can be made in the above disclosure and drawings, without exceeding the scope of the following claims.

Having thus described the invention, what is claimed is:

1. In a vertical elogated tank of the type to flush a toilet bowl comprising top, side and bottom walls, water discharge means through said bottom wall, plug means to close said water discharge means, actuating means connected to said plug means and extending axially through the top wall of said tank, inlet means to be connected with a water supply system, grip means at a protruding top end of said actuating means with said actuating means being slidable between closed and opened positions with respect to said discharge means, and means allowing air to escape from said tank as the water level rises, the improvements comprising:
   (a) an inlet valve connected to said inlet means to control the entrance of water into said tank;
   (b) plug means provided in said inlet valve, said plug means vertically slidable inside same between an upper closed position and a lower open position;
   (c) buoyant means located about the maximum water level inside said tank, provided with link means connecting the same to said plug means of said inlet valve;
   (d) pushing means suitable to force said inlet valve plug means to the open position upon actuation of said actuating means, overcoming an upwards thrust thereon by said buoyant means; and
   (e) guide means to guide the vertical movement of said actuating means and said link means.

2. The invention according to claim 1, wherein said inlet valve further comprises:
   (a) a generally cylindrical hollow body;

(b) an inverted generally frusto-conical inner portion, at the lower end of said body through which an inlet passage extends;

(c) an internal water chamber, surrounding said frusto-conical inner portion and extending upwardly beyond the top end thereof;

(d) a valve seat, at the upper end of said cylindrical body, defining an outlet passage in fluid communication to said chamber; and (e) link means connecting said plug means to said buoyant means, said link means passing through an axial top opening in said cylindrical body and into said outlet passage, to be coupled to said plug means.

3. The invention according to claim 2, wherein the top end of the frusto-conical inner portion is provided with a cup-like recess open at the top, of a size suitable to contain a substantial portion of said plug means when in its open position.

4. The invention according to claim 2, wherein said frusto-conical inner portion further defines a plurality of small lateral passages extending radially from said inlet passage, into said internal water chamber.

5. The invention according to claim 1, wherein said pushing means comprises:

(a) a supporting means, extending adjacent said inlet valve;

(b) carrying means, extending upwardly from said supporting means, beyond the top end of said valve;

(c) rocking means pivotally attached atop said carrying means such that one end extends into a ring formed in said link means; and, (d) driver means carried by said actuating means and located so as to pivot said rocking means thereby moving said plug means of the inlet valve into its open position.

6. The invention of claim 1, wherein said guide means comprise:

(a) first plate means, defining guiding apertures, attached to and located near the top of said tank; and (b) second plate means, defining a guide aperture, attached to and located near the bottom of said tank, wherein said first plate means guides the sliding movement of said actuating means and said link means, and said second plate means guides the sliding movement of just said actuating means, said apertures for the actuating means being vertically aligned to each other and to said discharge means.

7. The invention of claim 1, wherein said top wall is a removable cover closing the top end of said tank, said top being provided with an aperture therein through which an end portion of said actuating means protrudes outside said tank, said aperture being vertically aligned with said discharge means.

8. The invention of claim 6, wherein said buoyant means is located above said first plate means, said first plate means comprising a stop means to define the lowermost position for said buoyant means.

* * * * *